US009819644B2

(12) United States Patent
Goel

(10) Patent No.: US 9,819,644 B2
(45) Date of Patent: Nov. 14, 2017

(54) MAKING INTERNATIONAL MOBILE SUBSCRIBER IDENTITY AVAILABLE AT BASE STATION

(71) Applicant: Altiostar Networks, Inc., Tewksbury, MA (US)

(72) Inventor: Anupam Kumar Goel, Bangalore (IN)

(73) Assignee: AltioStar Networks, Inc., Tewksbury, MA (US)

( * ) Notice: Subject to any disclaimer, the term of this patent is extended or adjusted under 35 U.S.C. 154(b) by 0 days.

(21) Appl. No.: 15/015,971

(22) Filed: Feb. 4, 2016

(65) Prior Publication Data
US 2017/0230332 A1    Aug. 10, 2017

(51) Int. Cl.
*H04W 4/24* (2009.01)
*H04L 29/12* (2006.01)
*H04M 15/00* (2006.01)
*H04W 8/02* (2009.01)

(52) U.S. Cl.
CPC ...... *H04L 61/6054* (2013.01); *H04L 61/1588* (2013.01); *H04M 15/8214* (2013.01); *H04W 4/24* (2013.01); *H04W 8/02* (2013.01)

(58) Field of Classification Search
CPC ..... H04W 84/045; H04W 8/26; H04W 88/16; H04W 88/08; H04W 76/021; H04W 76/02; H04W 12/06; H04W 80/04; H04W 8/18; H04W 48/02; H04W 4/24
USPC ................................................. 455/405–409
See application file for complete search history.

(56) References Cited

U.S. PATENT DOCUMENTS

| | | | | |
|---|---|---|---|---|
| 2009/0176479 A1* | 7/2009 | Vikberg | ................ | H04M 15/00 455/406 |
| 2009/0185040 A1* | 7/2009 | Yang | ................... | H04L 65/4092 348/207.11 |
| 2010/0113000 A1 | 5/2010 | Yao | | |
| 2011/0065466 A1* | 3/2011 | Sakoda | ................. | H04W 24/08 455/507 |

(Continued)

FOREIGN PATENT DOCUMENTS

| | | |
|---|---|---|
| EP | 2523505 A1 | 11/2012 |
| EP | 2747376 A1 | 6/2014 |
| EP | 2947903 A1 | 11/2015 |

OTHER PUBLICATIONS

International Search Report and Written Opinion for Application No. PCT/US2016/017585, dated Dec. 20, 2016.

*Primary Examiner* — Allahyar Kasraian
(74) *Attorney, Agent, or Firm* — Mintz Levin Cohn Ferris Glovsky and Popeo, P.C.

(57) ABSTRACT

The subject matter described herein generally relates to making an international mobile subscriber identity (IMSI) available at a base station, such as an evolved node (eNodeB) base station, within a cellular network, for example, a long term evolution communications system. The base station can receive data in response to a data request. The received data can include a header including an international mobile subscriber identifier. The base station can generate a first data for use in performing at least one communication function based on the received international mobile subscriber identifier. The base station can transmit the first data to at least one server communicatively coupled to the base station. Related apparatuses, systems, techniques and articles are also described.

20 Claims, 11 Drawing Sheets

(56) References Cited

U.S. PATENT DOCUMENTS

| | | | |
|---|---|---|---|
| 2012/0039312 A1* | 2/2012 | Narkar | H04W 8/00 370/338 |
| 2012/0054809 A1* | 3/2012 | Chowdhury | H04N 21/2223 725/93 |
| 2012/0214480 A1* | 8/2012 | Ionescu | H04W 4/001 455/425 |
| 2013/0281081 A1* | 10/2013 | Kawaguchi | H04W 8/26 455/422.1 |
| 2014/0043980 A1 | 2/2014 | Anthony, Jr. et al. | |
| 2014/0189808 A1* | 7/2014 | Mahaffey | H04L 63/0853 726/4 |
| 2016/0262190 A1* | 9/2016 | Bitar | H04W 76/022 |

* cited by examiner

MAKING INTERNATIONAL MOBILE SUBSCRIBER IDENTITY AVAILABLE AT BASE STATION

TECHNICAL FIELD

The current subject matter described herein generally relates to making an international mobile subscriber identity (IMSI) available at a base station, such as an evolved node (eNodeB) base station, within a cellular network, for example, a long term evolution communications system.

BACKGROUND

An international mobile subscriber identity (IMSI) is a unique number associated with user equipment (for example, a cellular phone) of cellular subscribers of a cellular network, such as one of a global system for mobile communications (GSM) network, a universal mobile telecommunications system (UMTS) network, a long-term evolution (LTE) network, and a CDMA2000 network. The IMSI can be stored either directly within the user equipment or within a subscriber identity module (SIM) card of the user equipment. The IMSI includes: an identifier that identifies a network operator to identify the cellular network provider with whom a subscriber has an account, and an identifier that uniquely identifies the user equipment or the SIM card and, thus, the subscriber registered as owner of the user equipment or the SIM card, respectively.

In a LTE network, messages, including the IMSI, are passed between a user equipment (UE) and a mobile management entity (MME) via a non-access stratum (NAS) functional layer of the LTE protocol stack. A base station (for example, an evolved Node B (eNodeB)) of the LTE network traditionally does not have the capability of deciphering NAS messages. The base station accordingly does not have access to the IMSI, and might, therefore, not match subscribers with respective communication data. Such matching of subscribers with corresponding communication data can be useful to perform many communication network functions, such as, for example, generating a financial charge of each subscriber based on usage of cellular data by each user, identifying subscribers and providing data to third party servers, etc., and the like. The base station, however, has the quickest and maximum access to most communication data, other than the IMSI, associated with a user. Therefore, there is a need to make IMSI available at the base station, as such availability can enable performance of the above-referred communication functions in a fast and accurate manner.

SUMMARY

The subject matter described herein generally relates to making an international mobile subscriber identity (IMSI) available at a base station, such as an evolved node (eNodeB) base station, within a cellular network, for example, a long term evolution communications system.

In one aspect, a base station can receive data in response to a data request. The received data can include a header including an international mobile subscriber identifier. The base station can generate a first data for use in performing at least one communication function based on the received international mobile subscriber identifier. The base station can transmit the first data to at least one server communicatively coupled to the base station.

In some variations, one or more of the following can additionally be implemented either individually or in any feasible combination. The base station can be an evolved node (eNodeB) base station comprising at least one processor and at least one memory. The international mobile subscriber identifier can identify a user equipment. The user equipment can generate the data request received by the base station. The header can be a hypertext transfer protocol (HTTP) response header, and can include a X-international mobile subscriber identity (X-IMSI) header containing the international mobile subscriber identifier. The at least one communication function can include at least one of the following: a charging function and an interception function. The first data can be a financial charge for the user equipment. At least one of the charging function and the interception function can be performed by at least one of the following: the base station and the at least one server.

The charging function can include computing, based on network data used by a user equipment generating the data request received by the base station, the financial charge for the user equipment. The financial charge can be associated with at least one of the following: the data request and the received data. The financial charge can be charged by a communications network provider. The first data can include an identification of at least one of the following: the user equipment, the data request, the data received in response to the data request, and the base station.

The interception function can include generating a report. The report can identify at least one of the following: a user equipment generating the data request received by the base station, the data request, the data received in response to the data request, and the base station. An authorized third party can receive the generated report.

In another aspect, a base station is described that can include: at least one programmable processor; and a machine-readable medium storing instructions that, when executed by the at least one processor, cause the at least one programmable processor to perform at least the following operations. The at least one programmable processor can receive data in response to a data request. The received data can include a header including an international mobile subscriber identifier. The at least one programmable processor can generate a first data for use in performing at least one communication function based on the received international mobile subscriber identifier. The at least one programmable processor can transmit the first data to at least one server communicatively coupled to the at least one programmable processor.

In some variations, one or more of the following can additionally be implemented either individually or in any suitable combination. The international mobile subscriber identifier can identify a user equipment. The user equipment can generate the data request received by the at least one programmable processor. The header can be a hypertext transfer protocol (HTTP) response header, and can include a X-international mobile subscriber identity (X-IMSI) header containing the international mobile subscriber identifier. The at least one communication function can include at least one of the following: a charging function and an interception function.

At least one of the charging function and the interception function can be performed by at least one of the following: the at least one processor and the at least one server. The charging function can include computing, based on network data used by a user equipment generating the data request received by the at least one programmable processor, a financial charge for the user equipment. The financial charge can be associated with at least one of the following: the data request and the received data. The first data can be the financial charge. The financial charge can be charged by a communications network provider. The first data can include an identification of at least one of the following: the user equipment, the data request, the data received in response to the data request, and the at least one programmable processor. The interception function can include generating a report. The report can identify at least one of the following: a user equipment generating the data request received by the at least one programmable processor, the data request, the data received in response to the data request, and the at least one programmable processor.

In yet another aspect, a non-transitory computer program product is described that can store instructions that, when executed by at least one programmable processor, cause the at least one programmable processor to perform at least the following operations. The at least one programmable processor can receive data in response to a data request. The received data can include a header including an international mobile subscriber identifier. The at least one programmable processor can generate a first data for use in performing at least one communication function based on the received international mobile subscriber identifier. The at least one programmable processor can transmit the first data to at least one server communicatively coupled to the at least one programmable processor.

In some variations, one or more of the following can additionally be implemented either individually or in any feasible combination. The international mobile subscriber identifier can identify a user equipment. The user equipment can generate the data request received by the at least one programmable processor. The header can be a hypertext transfer protocol (HTTP) response header, and can include a X-international mobile subscriber identity (X-IMSI) header containing the international mobile subscriber identifier. The at least one communication function can include at least one of the following: a charging function and an interception function. At least one of the charging function and the interception function can be performed by at least one of the following: the at least one processor and the at least one server.

The charging function can include computing, based on network data used by a user equipment generating the data request received by the at least one programmable processor, a financial charge for the user equipment. The financial charge can be associated with at least one of the following: the data request and the received data. The first data can be the financial charge. The financial charge can be charged by a communications network provider. The first data can include an identification of at least one of the following: the user equipment, the data request, the data received in response to the data request, and the at least one programmable processor. The interception function can include generating a report. The report can identify at least one of the following: a user equipment generating the data request received by the at least one programmable processor, the data request, the data received in response to the data request, and the at least one programmable processor.

Articles are also described that comprise a tangibly embodied machine-readable media embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein. Additionally, computer systems may include additional specialized processing units that are able to apply a single instruction to multiple data points in parallel. Such units include but are not limited to graphics processing units (GPU).

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a;

FIG. 1c illustrates additional detail of the evolved packet core (EPC) of the exemplary LTE system shown in FIG. 1a;

FIG. 1d illustrates an exemplary evolved Node B of the exemplary LTE system shown in FIG. 1a;

Like reference symbols in the various drawings indicate like elements.

DETAILED DESCRIPTION

In some implementations, the current subject matter described herein generally relates to making an international mobile subscriber identity (IMSI) available at a base station (for example, evolved node B, which can also be referred to as eNodeB) within a cellular network (for example, long-term evolution (LTE) network). Making IMSI available at the base station can advantageously enable performance of at least one of the following communication network functions in a fast and accurate manner: generating a financial charge of each subscriber based on usage of cellular data by each user, identifying subscribers and providing subscriber/connection data to third party servers, etc.

In some implementations, the current subject matter relates to a computer-implemented method. The method can include receiving data in response to a data request, the received data including a header including an international mobile subscriber identifier, generating a first data for use in performing at least one communication function based on the received international mobile subscriber identifier, and transmitting the first data to at least one server, where the server can be communicatively coupled to a base station that can perform at least one of the receiving, the generating, and the transmitting. The base station can receive the request, such as a request for a webpage, from a user equipment (UE). The base station can transmit the request to an evolved packet core (EPC). The EPC can retrieve data, which can include a header, in response to the request from an application server. The EPC can add an IMSI in the retrieved header. The base station can receive the header, which can include the IMSI, from the EPC. The base station can generate a first data for use in performing at least one communication function based on the received IMSI. The base station can transmit the first data to at least one server configured to be communicatively coupled to the base station.

In some implementations, the current subject matter can be implemented in a wireless communication system, such as a long term evolution system, where some of its components are discussed below.

FIGS. 1a-c and 2 illustrate an exemplary long term evolution (LTE) communications system 100. The system 100 can also be referred to as 4G LTE in some implementations. The system 100 is governed by a standard for wireless communication of high-speed data for mobile telephones and data terminals. This standard is based on the Global System for Mobile Communications/Enhanced Data rates for GSM Evolution (GSM/EDGE) as well as Universal Mobile Telecommunications System/High Speed Packet Access (UMTS/HSPA) network technologies. The standard is developed by the 3rd Generation Partnership Project (3GPP).

Figure 1A:
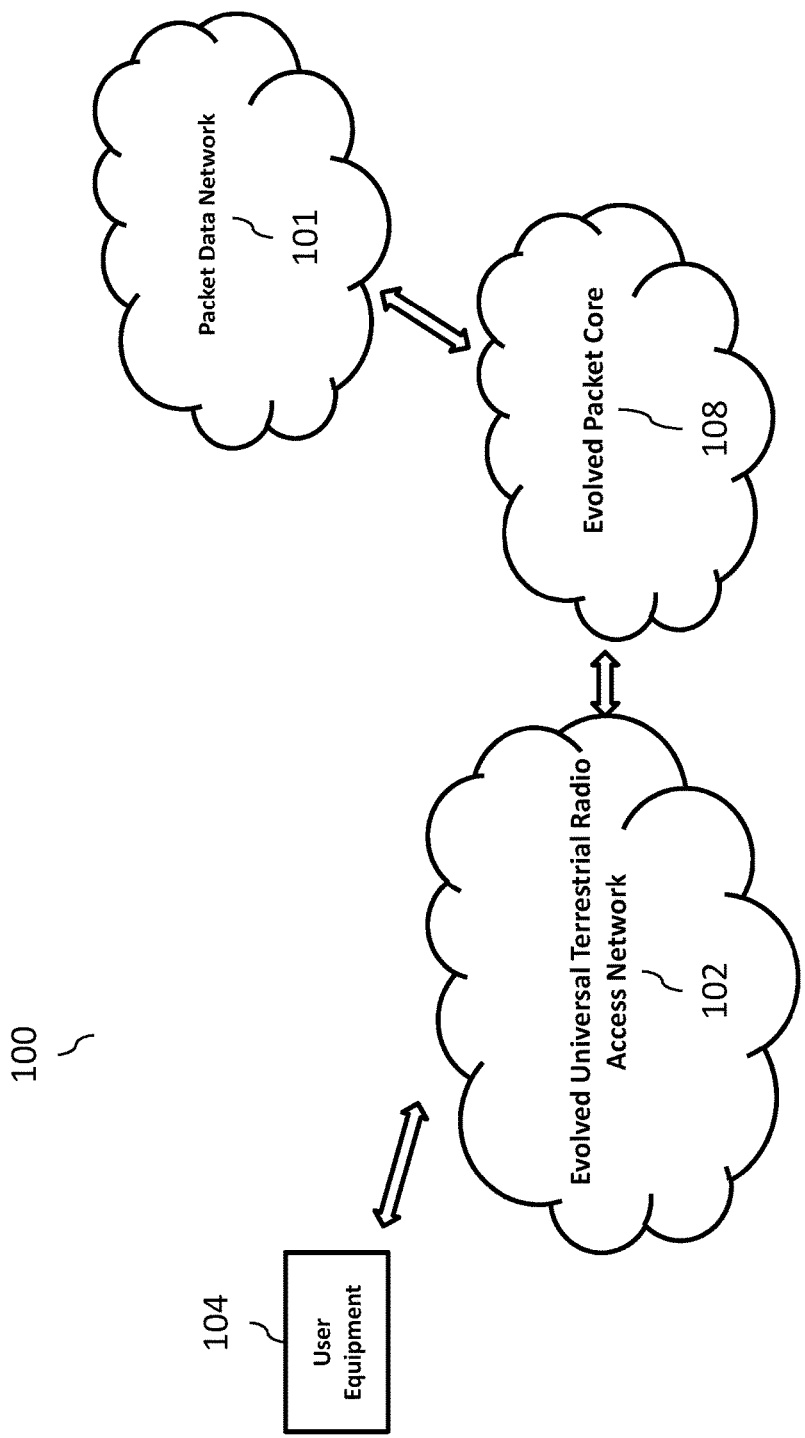
FIG. 1a illustrates an exemplary long term evolution (LTE) communications system.
Figure 1B:
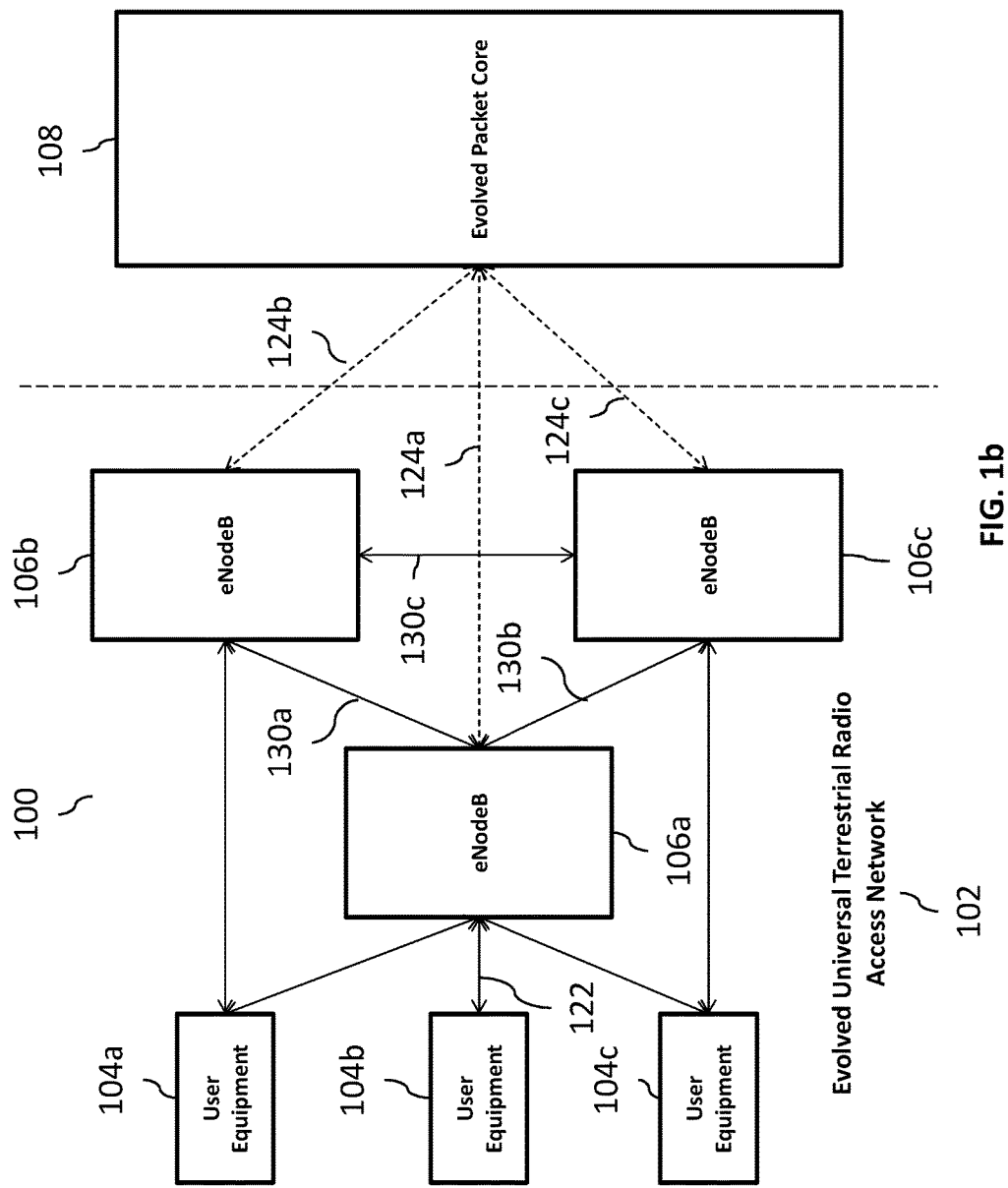

As shown in FIG. 1a, the system 100 can include an evolved universal terrestrial radio access network (EUTRAN) 102, an evolved packet core (EPC) 108, and a packet data network (PDN) 101, where the EUTRAN 102 and EPC 108 provide communication between a user equipment 104 and the PDN 101. The EUTRAN 102 can include a plurality of evolved node B's (also referred to as any of eNodeB, ENODEB, enodeb, and eNB) or base stations 106 (a, b, c) (as shown in FIG. 1b) that provide communication capabilities to a plurality of user equipment 104(a, b, c). The user equipment 104 can be a mobile telephone, a smartphone, a table, a personal computer, a personal digital assistant (PDA), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the system 100, the EUTRAN 102 and EPC 108 work together to provide connectivity, mobility and services for the user equipment 104.

Figure 1C:
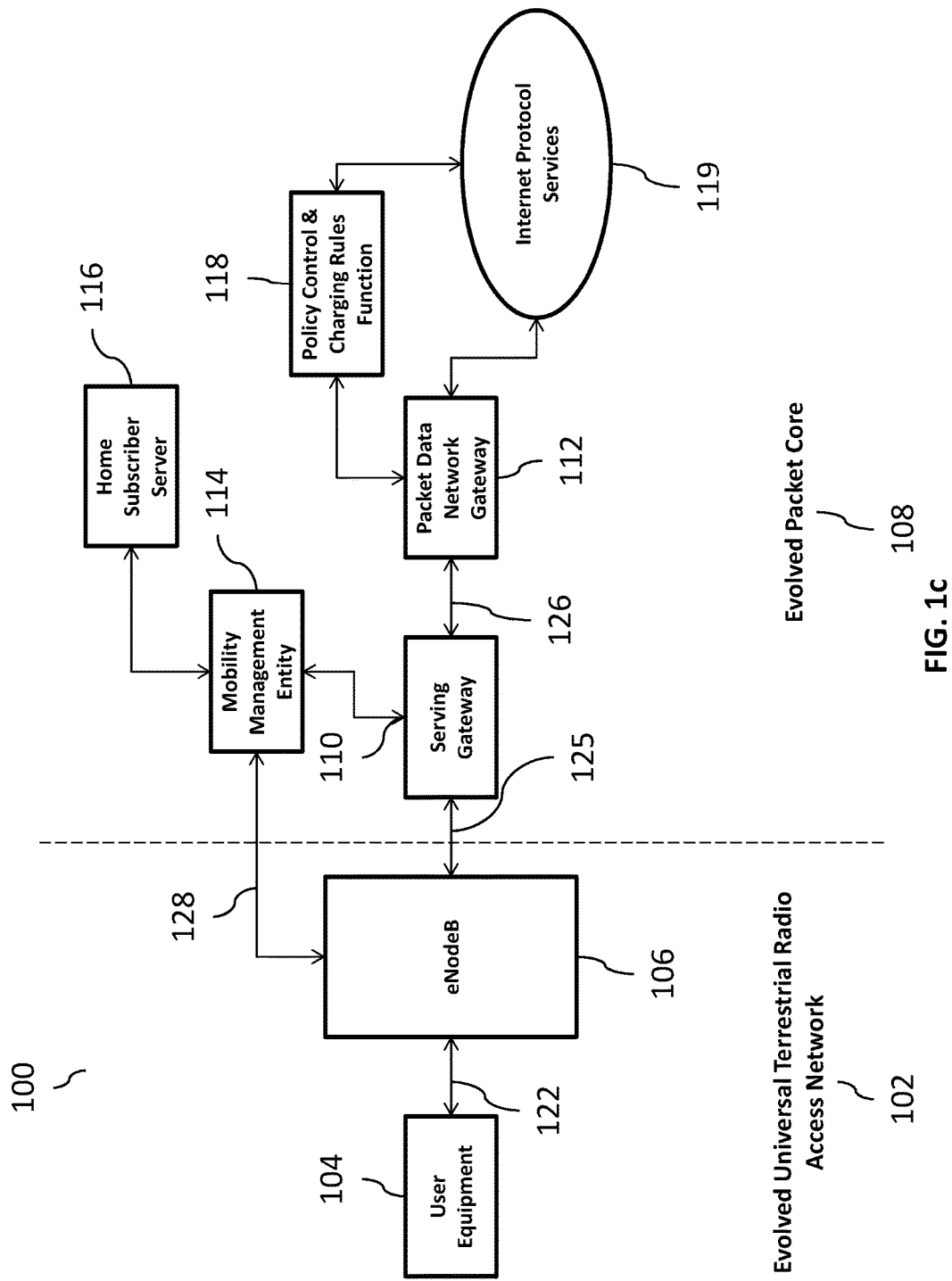

FIG. 1b illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMEs, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as LTE-Uu interface). As shown in FIG. 1b, the air interface 122 provides communication between user equipment 104b and the eNodeB 106a. The air interface 122 uses Orthogonal Frequency Division Multiple Access (OFDMA) and Single Carrier Frequency Division Multiple Access (SC-FDMA), an OFDMA variant, on the downlink and uplink respectively. OFDMA allows use of multiple known antenna techniques, such as, Multiple Input Multiple Output (MIMO).

The air interface 122 uses various protocols, which include a radio resource control (RRC) for signaling between the user equipment 104 and eNodeB 106 and non-access stratum (NAS) for signaling between the user equipment 104 and MME (as shown in FIG. 1c). In addition to signaling, user traffic is transferred between the user equipment 104 and eNodeB 106. Both signaling and traffic in the system 100 are carried by physical layer (PHY) channels.

Multiple eNodeBs 106 can be interconnected with one another using an X2 interface 130(a, b, c). As shown in FIG. 1a, X2 interface 130a provides interconnection between eNodeB 106a and eNodeB 106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1c) and the other for the user plane (shown as user plane interface (S1-U interface) 125 in FIG. 1c).

The EPC 108 establishes and enforces Quality of Service (QoS) for user services and allows user equipment 104 to maintain a consistent internet protocol (IP) address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1c. The EPC 108 includes a serving gateway (S-GW) 110, a PDN gateway (P-GW) 112, a mobility management entity (MME) 114, a home subscriber server (HSS) 116 (a subscriber database for the EPC 108), and a policy control and charging rules function (PCRF) 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1*a*). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMES in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function (PCEF), which resides in the P-GW 110. The PCRF 118 provides the QoS authorization (QoS class identifier (QCI) and bit rates) that decides how a certain data flow will be treated in the PCEF and ensures that this is in accordance with the user's subscription profile.

As stated above, the IP services 119 are provided by the PDN 101 (as shown in FIG. 1*a*).

Figure 1D:
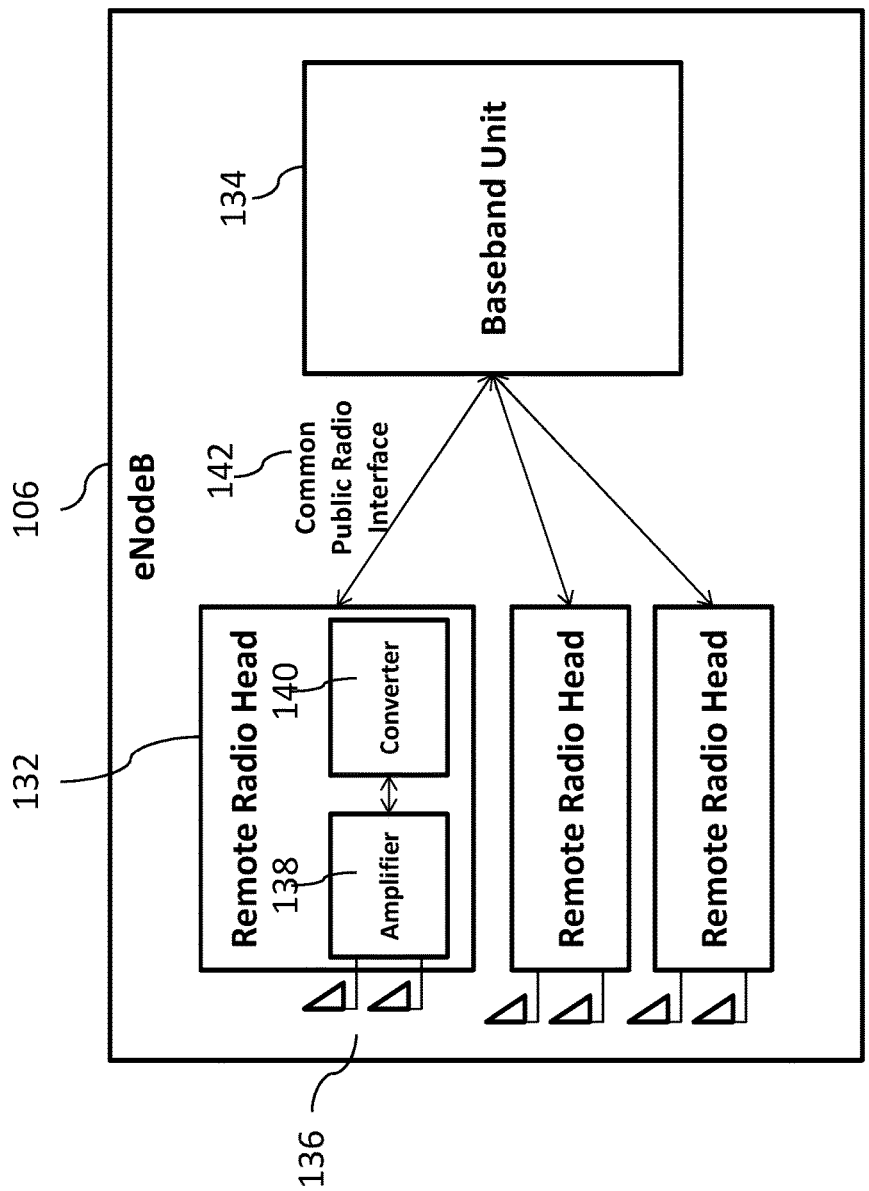

FIG. 1*d* illustrates an exemplary structure of eNodeB 106. The eNodeB 106 can include at least one remote radio head (RRH) 132 and a baseband unit (BBU) 134. Typically, there can be three RRH 132, as shown. The RRH 132 can be connected to antennas 136. The RRH 132 and the BBU 134 can be connected using an optical interface that is compliant with common public radio interface (CPRI) 142 standard specification. The operation of the eNodeB 106 can be characterized using the following standard parameters (and specifications): radio frequency band (Band4, Band9, Band17), bandwidth (5, 10, 15, 20 MHz), access scheme (downlink: OFDMA; uplink: SC-OFDMA), antenna technology (downlink: 2×2 MIMO; uplink: 1×2 single input multiple output (SIMO)), number of sectors (6 maximum), maximum transmission power (60 W), maximum transmission rate (downlink: 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1*d*) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter (CONV) 140) digital baseband signals from the BBU 134 into radio frequency (RF) signals and power amplify (using amplifier (AMP) 138) them for transmission to user equipment 104 (not shown in FIG. 1*d*). Conversely, the RF signals that are received from user equipment 104 are amplified (using AMP 138) and converted (using CONV 140) to digital baseband signals for transmission to the BBU 134.

Figure 2:
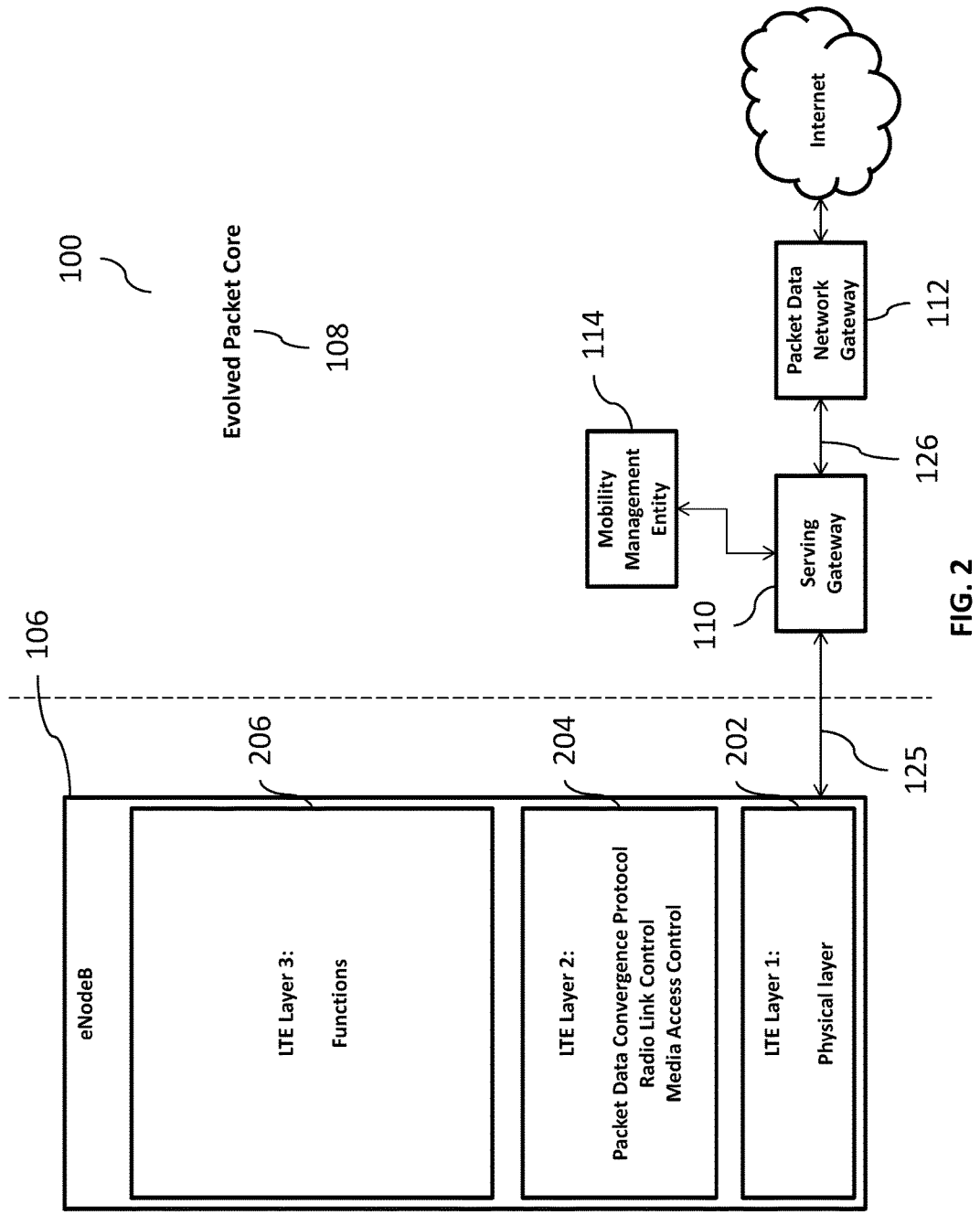
FIG. 2 illustrates further detail of an evolved Node B shown in FIGS. 1a-d.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer (PHY). The LTE layer 2 includes a media access control (MAC), a radio link control (RLC), a packet data convergence protocol (PDCP). The LTE layer 3 includes various functions and protocols, including a radio resource control (RRC), a dynamic resource allocation, eNodeB measurement configuration and provision, a radio admission control, a connection mobility control, and radio resource management (RRM). The RLC protocol is an automatic repeat request (ARQ) fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1*d*, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMEs and S-GWs. The eNodeB 106 selects an MME from a group of MMEs so the load can be shared by multiple MMEs to avoid congestion.

Figure 3:
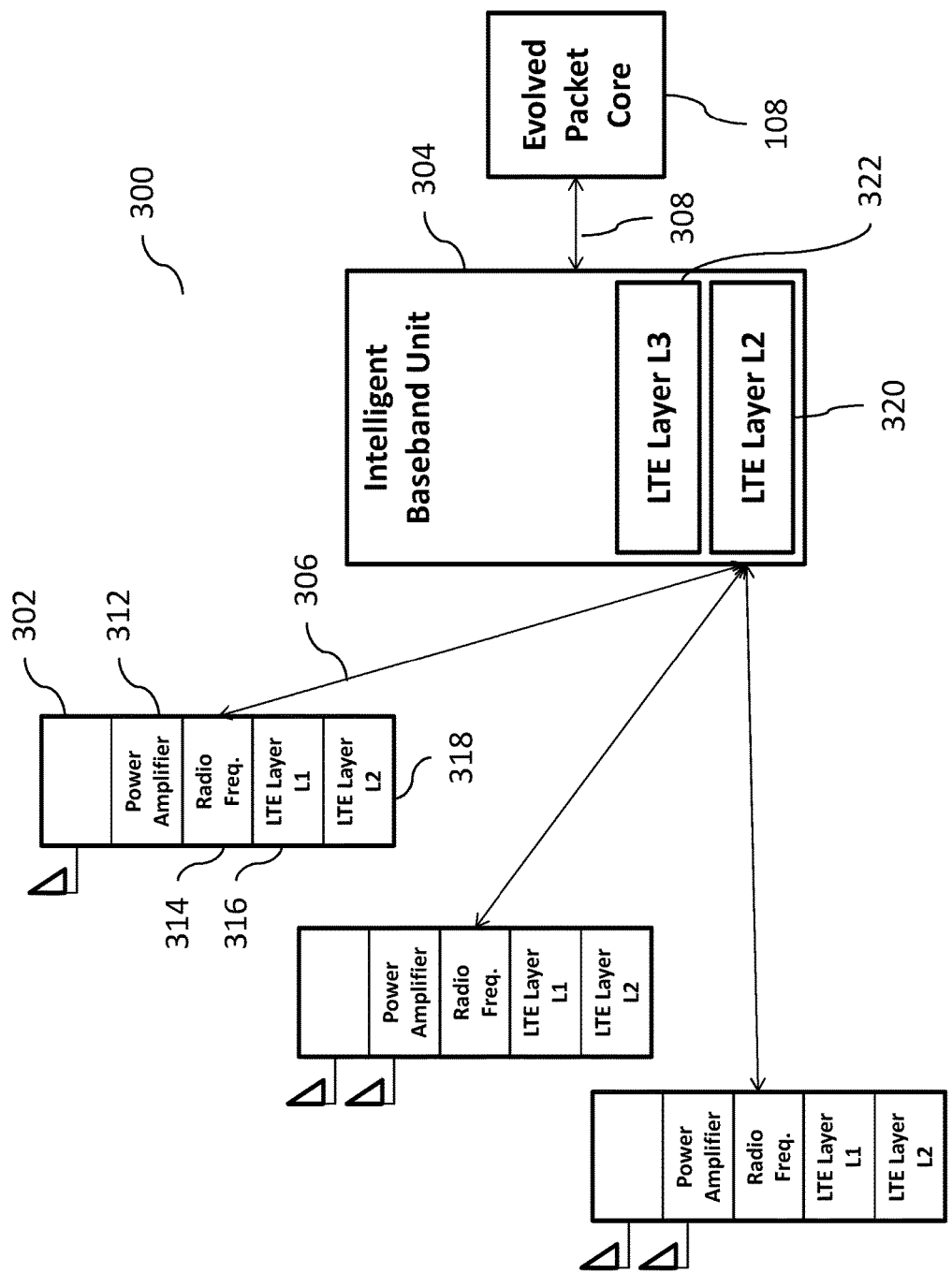
FIG. 3 illustrates an exemplary intelligent Long Term Evolution Radio Access Network.

FIG. 3 illustrates an exemplary system 300 of an exemplary intelligent Long Term Evolution Radio Access Network. The system 300 can be implemented as a centralized cloud radio access network (C-RAN). The system 300 can include at least one intelligent remote radio head (iRRH) unit 302 and an intelligent baseband unit (iBBU) 304. The iRRH 302 and iBBU 304 can be connected using Ethernet fronthaul (FH) communication 306 and the iBBU 304 can be connected to the EPC 108 using backhaul (BH) communication 308. The user equipment 104 (not shown in FIG. 3) can communicate with the iRRH 302.

In some implementations, the iRRH 302 can include the power amplifier (PA) module 312, the radio frequency (RF) module 314, LTE layer L1 (or PHY layer) 316, and a portion 318 of the LTE layer L2. The portion 318 of the LTE layer L2 can include the MAC layer and can further include some functionalities/protocols associated with RLC and PDCP, as will be discussed below. The iBBU 304 can be a centralized unit that can communicate with a plurality of iRRH and can include LTE layer L3 322 (e.g., RRC, RRM, etc.) and can also include a portion 320 of the LTE layer L2. Similar to portion 318, the portion 320 can include various functionalities/protocols associated with RLC and PDCP. Thus, the system 300 can be configured to split functionalities/protocols associated with RLC and PDCP between iRRH 302 and the iBBU 304.

Figure 4:
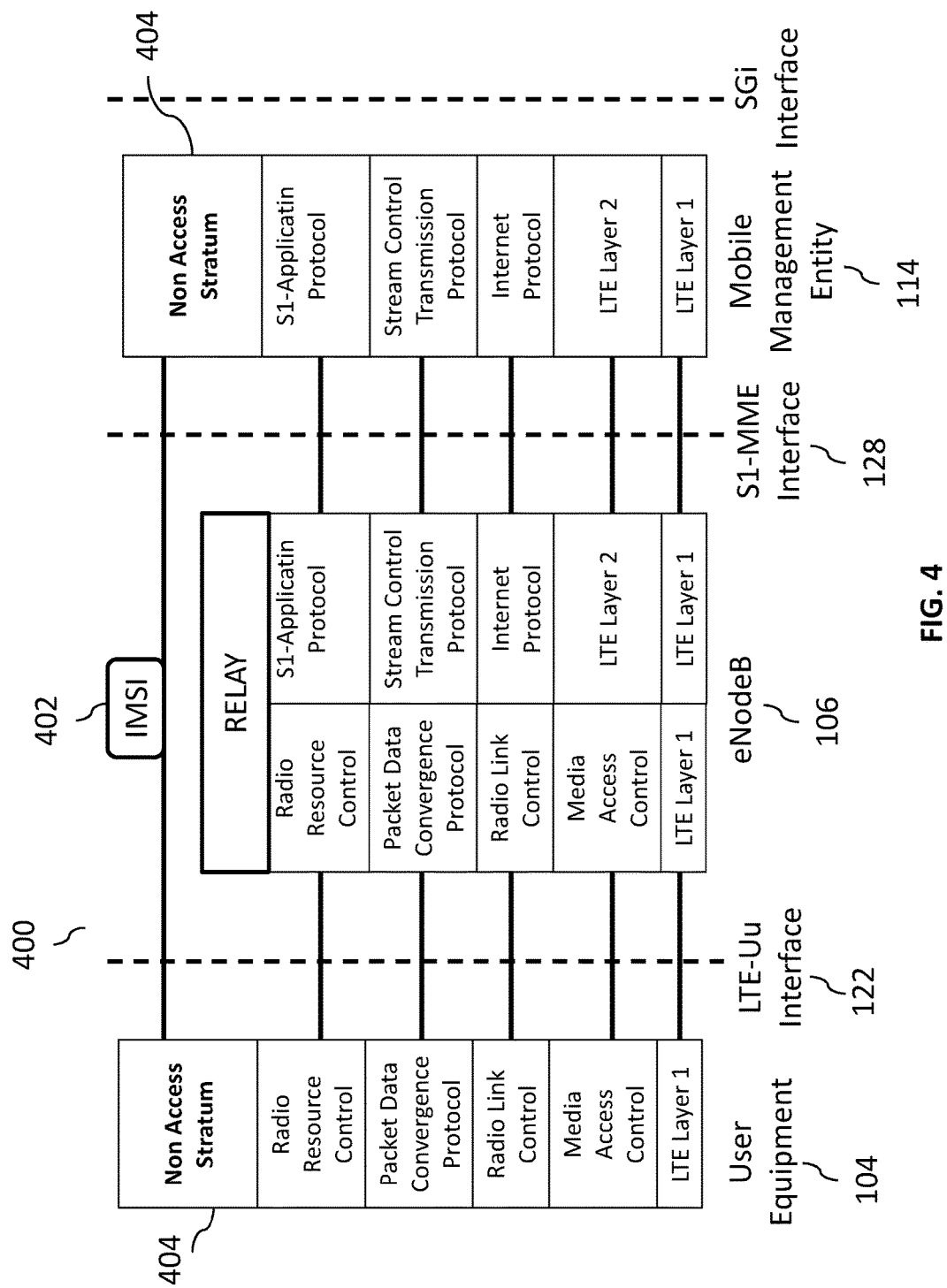
FIG. 4 illustrates an exemplary LTE control plane architecture where international mobile subscriber identity (IMSI) is unavailable at evolved Node B.

FIG. 4 illustrates an exemplary LTE control plane architecture 400 where international mobile subscriber identity (IMSI) 402 is unavailable at eNodeB. As shown, messages, including the IMSI 402, are passed between a user equipment 104 and a mobile management entity 114 via a non-access stratum (NAS) functional layer 404 of the LTE protocol stack. A base station (for example, an eNodeB) 106 of the LTE network traditionally does not have the capability of deciphering messages transmitted in the NAS functional layer 404. The base station 106 accordingly does not have access to the IMSI 402.

As the base station 106 does not have access to the IMSI 402, as shown, such base station does not have the capability to match subscribers with respective communication data (e.g., either requested, received, and/or transmitted by such subscribers). Such matching of subscribers with corresponding communication data can be useful to perform various communication network functions, such as generating financial charges associated with each subscriber's usage of cellular data, bandwidth, identifying subscribers and providing data to third party servers, etc. The base station 106 can have the quickest and maximum access to most communication data, other than the IMSI 402, associated with a user. In some implementations, the current subject matter system (as for example, illustrated by the process shown in FIG. 6 discussed below in further detail) can make IMSI 402 available at the base station 106 and enable performance of the above-referred communication functions in a fast and accurate manner.

Figure 5:
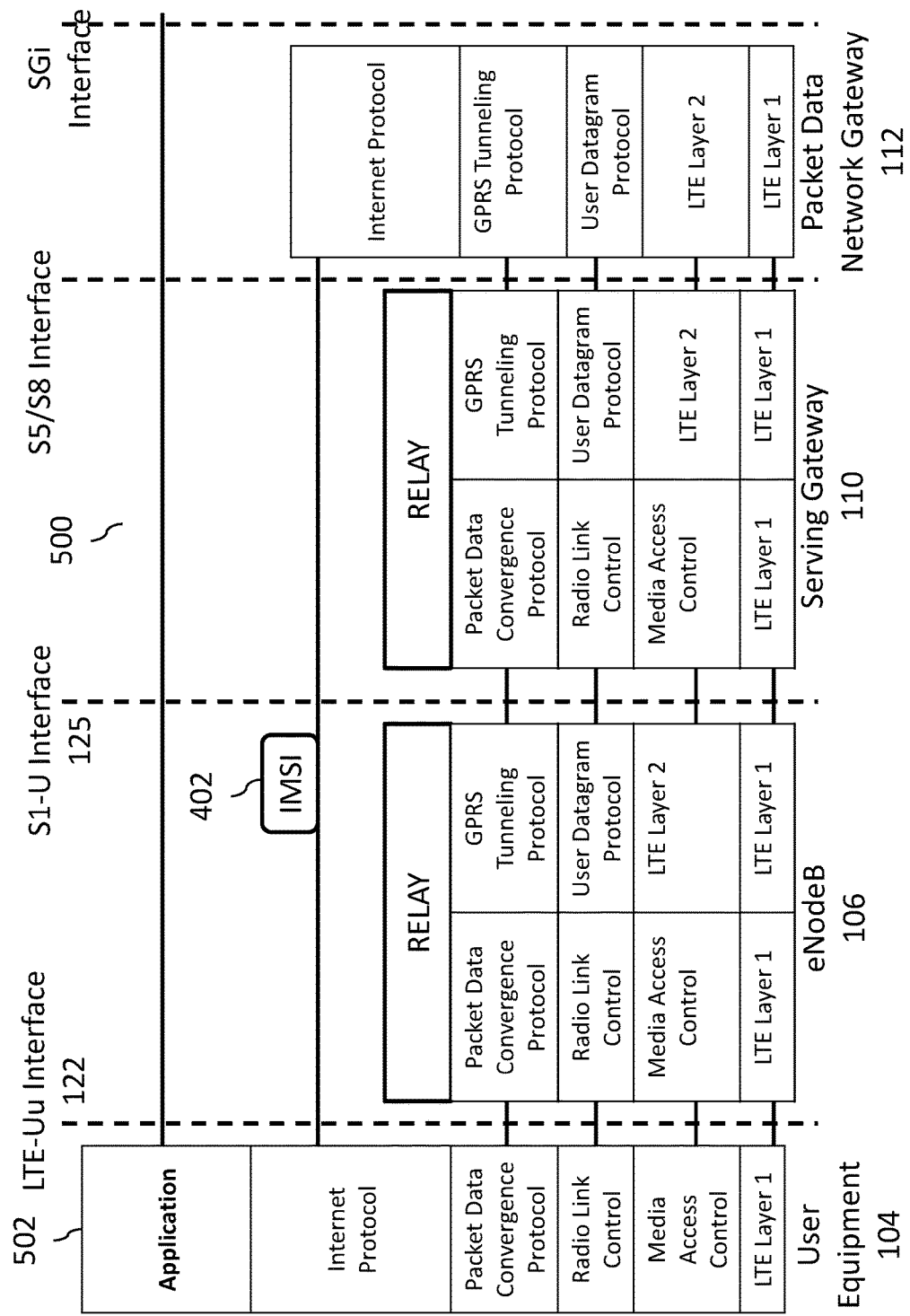
FIG. 5 illustrates an exemplary LTE data plane architecture where IMSI is unavailable at evolved Node B.

FIG. 5 illustrates an exemplary LTE data plane architecture 500 where IMSI is unavailable at evolved Node B. As shown in FIG. 5, the user equipment 104 can be running an application 502, e.g., a web browser, an email, a video browser, etc., that may be requesting data from a server (not shown in FIG. 5) and the data can be transmitted back to the application 502. The IMSI 402 can be passed between the user equipment 104 and the packet data network gateway 112, but would not accessible to the base station 106.

Figure 6:
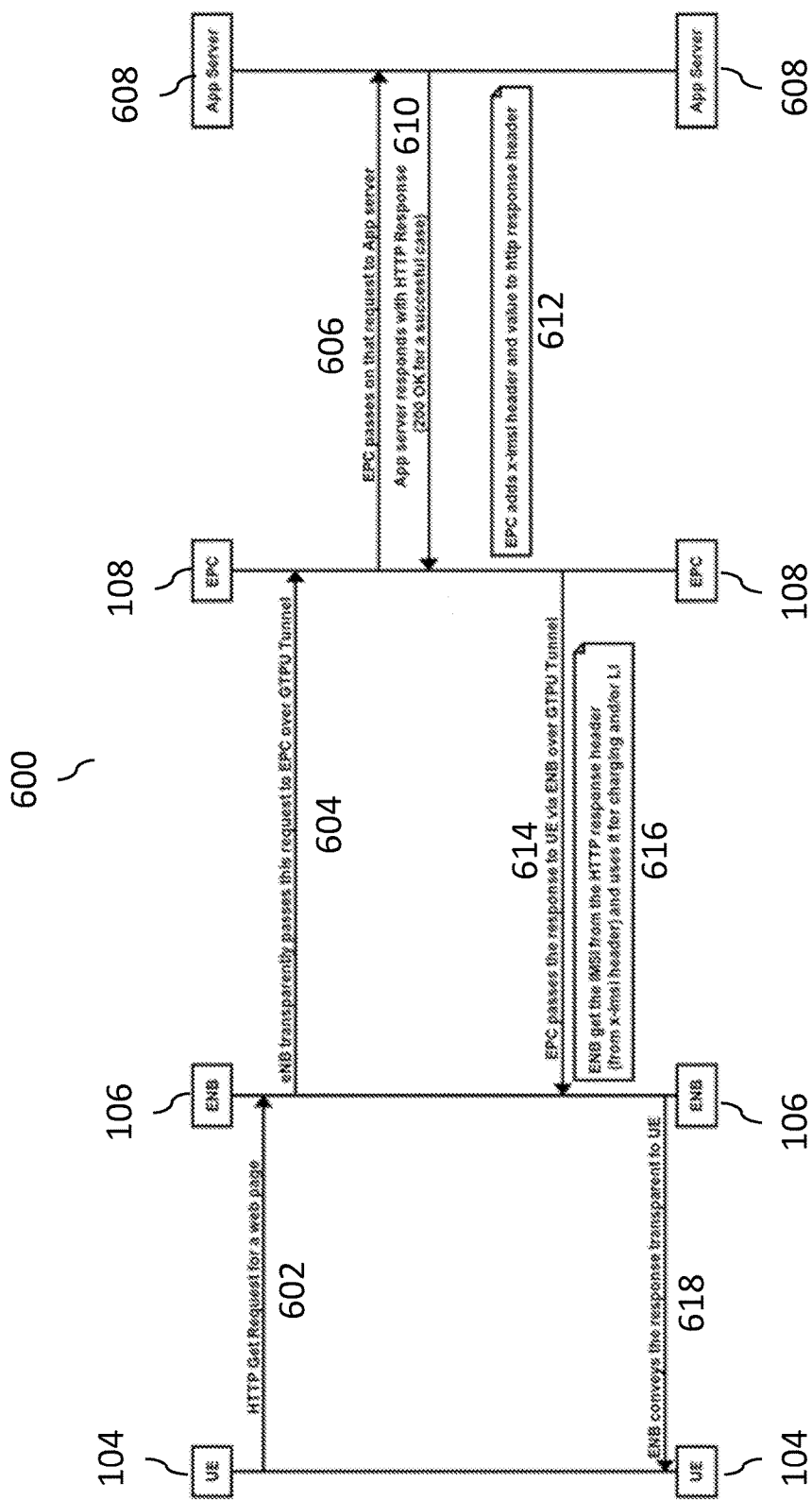
FIG. 6 illustrates an exemplary process for making available of IMSI at evolved Node B, according to some implementations of the current subject matter.

FIG. 6 illustrates an exemplary process 600 for making IMSI available at an eNodeB, according to some implementations of the current subject matter. The process 600 can be performed between the user equipment 104, a base station 106 (e.g., an eNodeB), an evolved packet core 108, and an application server 608. The user equipment 104 can be a mobile telephone, a smartphone, a tablet, a personal computer, a laptop computer, and/or any other network device. The user equipment 104 can receive and/or transmit data to other user equipments and/or application server(s), e.g., application server 608, which can store and/or process various data, which can be requested by one or more applications running by the user equipment 104.

At 602, the eNodeB 106 can receive a request for data from the user equipment 104. The request can be a hypertext transfer protocol (HTTP) request and/or any other request. This data can be a web page, a video, an audio, and/or any other type of data. At 604, the eNodeB 106 can transmit the request to the evolved packet core 108 via a general packet radio service (GPRS) tunneling protocol (GTP) user data tunnel (GTP-U). At 606, the EPC 108 can transfer the request to the application server 608. The application server 608 can process the request, determine the data responsive to the request and transmit the responsive data to the user equipment 104, at 610. The application server 608 can transmit the data back to the EPC 108 using an HTTP response. The response data can include an HTTP response header, which can be added by the EPC 108 and can include a X-international mobile subscriber identity (X-IMSI) header and a value to the response header, at 612. "X" in "X-IMSI" can indicate that the application protocol is associated with unstandardized parameters. "X" in "X-IMSI" can be understood to be eXperimental or eXtension. The HTTP does not support an IMSI header, but supports the X-IMSI header. The "value" added to the HTTP response header at 612 can refer to the value inserted in the actual IMSI of the user equipment 104. The IMSI 402 contained in the X-IMSI header can be used to uniquely identify the user equipment 104 from a plurality of user equipments being serviced by wireless networks and/or a particular base station and/or a group of base stations. At 614, the EPC 108 can transmit the responsive data, received from the server 608, along with the X-IMSI header, containing the IMSI 402, to the eNodeB 106. This transmission can occur over the GTP-U user data tunnel.

At 616, the eNodeB 106 can perform various functions that can make use of the IMSI 402, which can include at least one of the following: charging, interception (for example, lawful interception), and/or any other functions (the charging function is shown in FIG. 6). The charging function can include computing a financial charge for the user equipment based on use of network data and/or bandwidth by the user equipment. The interception function can include collection of various data related to the communication between the user equipment 104 and the application server 608. The data used and/or collected in connection with performance of these functions can be forwarded to a third party server. At 618, the eNodeB 106 can pass the HTTP response to the user equipment 104 after removing (which can also be referred to as stripping) the X-IMSI from the HTTP response.

Figure 7:
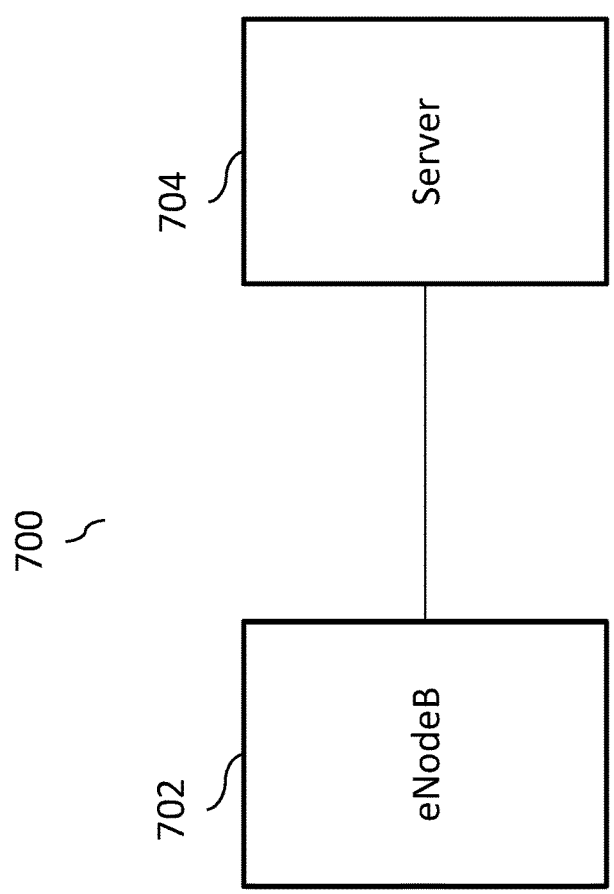
FIG. 7 illustrates an exemplary communications system for transmission of data from a base station to a third party server, according to some implementations of the current subject matter.

FIG. 7 illustrates an exemplary communications system 700 for transmission of data from a base station (e.g., an eNodeB) 702 to a third party server 704, according to some implementations of the current subject matter. Upon receipt of a particular data, the eNodeB 702 can determine which server 704 (in a plurality of servers) should receive the data associated with the communication between the user equipment 104 and the application server 608, and forward it to the server 704 for further processing.

In some implementations, the third party server 704 can be associated with a communication service provider. In this case, data useful to the service provider can include financial charge(s) associated with the user equipment usage of the wireless network's connections as provided by the service provider.

In some implementations, the third party server 704 can collect various information related to the communications between the user equipment 104 and the application server 608 using the interception function discussed above. The interception function can include generation of a report for at least one predetermined user registered to use the user equipment. The report can include an identification of at least one of the following: one or more users registered to use the user equipment 104, the data contained in the request received from the user equipment 104, the response data retrieved in response to the request, and/or any other data. The third party can be any party that may be authorized to access such user data, such as a network administrator, an authorized individual of an entity operating the eNodeB 106, an authorized third party, a law enforcement agency, and/or any other entity.

Referring back to FIG. 6, at 618, the eNodeB 106 can first strip the X-IMSI from the HTTP response. The eNodeB 106 can then transmit the response data to the user equipment 104. The eNodeB 106 can also transmit (not shown FIG. 6), after stripping the X-IMSI from the HTTP response, the data useful to the third party to the third party server 704 (as shown in FIG. 7) that can be communicatively coupled with the eNodeB 106.

In some implementations, the eNodeB 106 can perform the above functions (e.g., charging, interception, etc.) based on the X-IMSI header information. In alternate embodiments, the eNodeB 106 can forward the X-IMSI header to the third party server and/or any other device for further processing, without performing any of the above functions (e.g., charging, interception, etc.).

Figure 8:
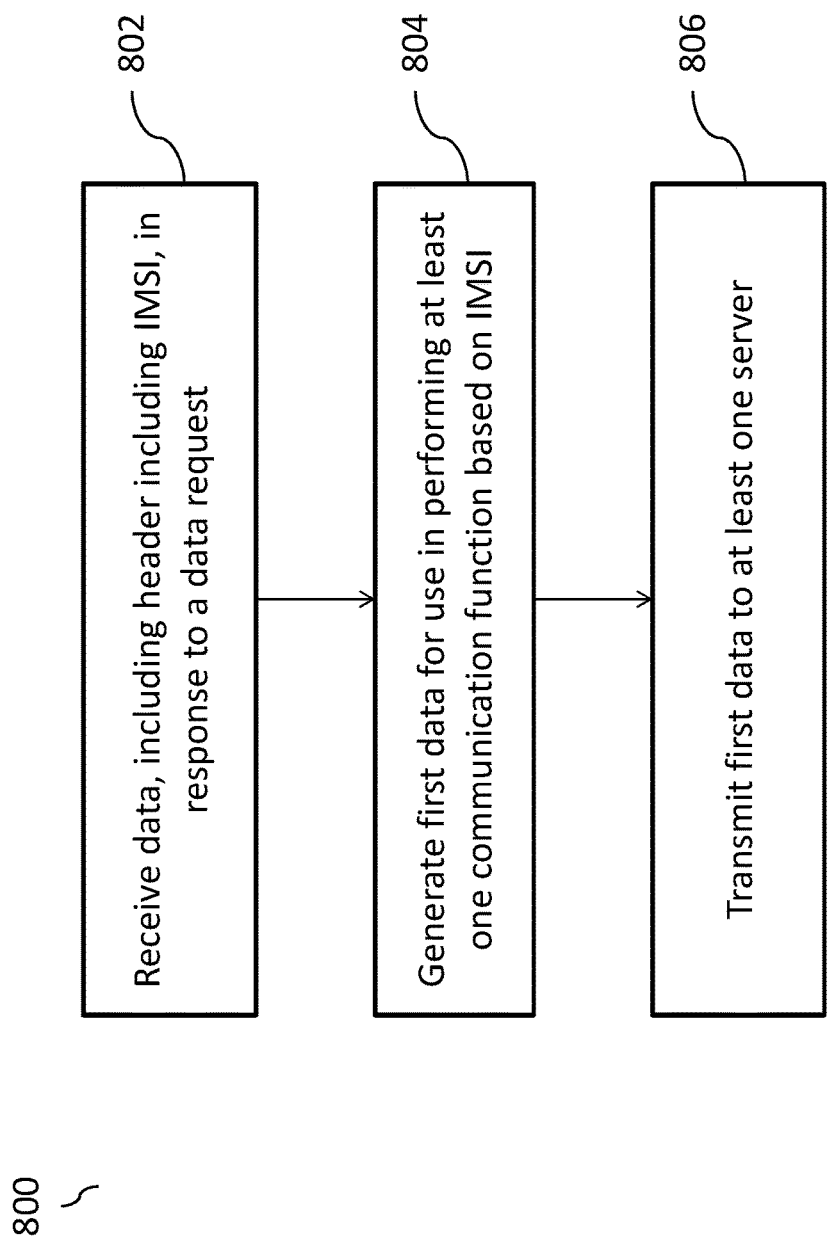
FIG. 8 illustrates an exemplary method, according to some implementations of the current subject matter.

FIG. 8 illustrates an exemplary process 800 for making IMSI 402 available at a base station (e.g., eNodeB) 106, according to some implementations of the current subject matter. At 802, the base station 106 can receive a data in response to a data request. The received data can include a header including an international mobile subscriber identifier (IMSI) 402. At 804, the base station 106 can generate a first data for use in performing at least one communication function based on the received IMSI 402. At 806, the base station 106 can transmit the first data to at least one server configured to be communicatively coupled to the base station 106.

The base station 106 can be an evolved node (eNodeB) base station 106, which can include at least one processor and at least one memory. The IMSI 402 can identify a user equipment 104 that generated the data request received by the base station 106. The header can be a hypertext transfer protocol (HTTP) response header. The header can include a X-international mobile subscriber identity (X-IMSI) header, which can include the IMSI 402. The at least one communication function can include at least one of the following: a charging function and an interception function. The charging function can include computing, based on network data used by a user equipment 104 generating the data request received by the base station 106, a financial charge for the user equipment 104. The financial charge can be associated with the data request and the received data. The first data can be the financial charge. The financial charge can be charged by a communications network provider.

The interception function can include generating a report. The report can identify at least one of: a user equipment 104 generating the data request received by the base station 106, the data request, the data received in response to the data request, and the base station 106. The first data, in this case, can include an identification of at least one of the user equipment 104, the data request, the data received in response to the data request, and the base station 106. The generated report can be used by any authorized party, such as a network administrator and/or a law enforcement agency.

At least one of the charging function and the interception function can be performed by at least one of the following: the base station 106 and the at least one server.

Various implementations of the subject matter described herein can be realized/implemented in digital electronic circuitry, integrated circuitry, specially designed application specific integrated circuits (ASICs), computer hardware, firmware, software, and/or combinations thereof. These various implementations can be implemented in one or more computer programs. These computer programs can be executable and/or interpreted on a programmable system. The programmable system can include at least one programmable processor, which can be a special purpose or a general purpose. The at least one programmable processor can be coupled to a storage system, at least one input device, and at least one output device. The at least one programmable processor can receive data and instructions from, and can transmit data and instructions to, the storage system, the at least one input device, and the at least one output device.

These computer programs (also known as programs, software, software applications or code) can include machine instructions for a programmable processor, and can be implemented in a high-level procedural and/or object-oriented programming language, and/or in assembly/machine language. As can be used herein, the term "machine-readable media" can refer to any computer program product, apparatus and/or device (for example, magnetic discs, optical disks, memory, programmable logic devices (PLDs)) used to provide machine instructions and/or data to a programmable processor, including a machine-readable media that can receive machine instructions as a machine-readable signal. The term "machine-readable signal" can refer to any signal used to provide machine instructions and/or data to a programmable processor.

To provide for interaction with a user, the subject matter described herein can be implemented on a computer that can display data to one or more users on a display device, such as a cathode ray tube (CRT) device, a liquid crystal display (LCD) monitor, a light emitting diode (LED) monitor, or any other display device. The computer can receive data from the one or more users via a keyboard, a mouse, a trackball, a joystick, or any other input device. To provide for interaction with the user, other devices can also be provided, such as devices operating based on user feedback, which can include sensory feedback, such as visual feedback, auditory feedback, tactile feedback, and any other feedback. The input from the user can be received in any form, such as acoustic input, speech input, tactile input, or any other input.

The subject matter described herein can be implemented in a computing system that can include at least one of a back-end component, a middleware component, a front-end component, and one or more combinations thereof. The back-end component can be a data server. The middleware component can be an application server. The front-end component can be a client computer having a graphical user interface or a web browser, through which a user can interact with an implementation of the subject matter described herein. The components of the system can be interconnected by any form or media of digital data communication, such as a communication network. Examples of communication networks can include a local area network, a wide area network, internet, intranet, Bluetooth network, infrared network, or other networks.

The computing system can include clients and servers. A client and server can be generally remote from each other and can interact through a communication network. The relationship of client and server can arise by virtue of computer programs running on the respective computers and having a client-server relationship with each other.

Although a few variations have been described in detail above, other modifications can be possible. For example, the logic flows depicted in the accompanying figures and described herein do not require the particular order shown, or sequential order, to achieve desirable results. Other embodiments may be within the scope of the following claims.

The invention claimed is:

1. A computer-implemented method comprising:
receiving, by a base station, data in response to a data request, wherein the data request is transmitted by a user equipment to the base station, the received data is transmitted from a core network communicatively coupled to the base station and includes a header including an international mobile subscriber identifier, the international mobile subscriber identifier is associated with the user equipment and added by the core network prior to transmission to the base station;
removing, by the base station, the international mobile subscriber identifier from the received data;
generating, by the base station, based on the removed international mobile subscriber identifier, a first data for use in performing at least one communication function; and
transmitting, by the base station, the first data to at least one server communicatively coupled to the base station.

2. The computer-implemented method according to claim 1, wherein the base station is an evolved node (eNodeB) base station comprising at least one processor and at least one memory.

3. The computer-implemented method according to claim 1, wherein the international mobile subscriber identifier identifies a user equipment, wherein the user equipment generates the data request received by the base station.

4. The computer-implemented method according to claim 1, wherein the header is a hypertext transfer protocol (HTTP) response header and includes a X-international mobile subscriber identity (X-IMSI) header containing the international mobile subscriber identifier.

5. The computer-implemented method according to claim 1, wherein the at least one communication function includes at least one of the following: a charging function and an interception function.

6. The computer-implemented method according to claim 5, wherein:
the first data is a financial charge for the user equipment; and
the charging function includes computing, based on network data used by a user equipment generating the data request received by the base station, the financial charge for the user equipment, the financial charge being associated with at least one of the following: the data request and the received data.

7. The computer-implemented method according to claim 6, wherein the financial charge is being charged by a communications network provider.

8. The computer-implemented method according to claim 5, wherein:
the first data includes an identification of at least one of the following: the user equipment, the data request, the data received in response to the data request, and the base station; and
the interception function includes generating a report, the report identifying at least one of the following: a user equipment generating the data request received by the base station, the data request, the data received in response to the data request, and the base station.

9. The computer-implemented method according to claim 8, wherein an authorized third party receives the generated report.

10. The computer-implemented method according to claim 5, wherein at least one of the charging function and the interception function are performed by at least one of the following: the base station and the at least one server.

11. A base station comprising:
at least one programmable processor; and
a machine-readable medium storing instructions that, when executed by the at least one processor, cause the at least one programmable processor to perform operations comprising:
receiving, by a base station, data in response to a data request, wherein the data request is transmitted by a user equipment to the base station, the received data is transmitted from a core network communicatively coupled to the base station and includes a header including an international mobile subscriber identifier, the international mobile subscriber identifier is associated with the user equipment and added by the core network prior to transmission to the base station;
removing, by the base station, the international mobile subscriber identifier from the received data;
generating, by the base station, based on the removed international mobile subscriber identifier, a first data for use in performing at least one communication function; and
transmitting, by the base station, the first data to at least one server communicatively coupled to the base station.

12. The base station according to claim 11, wherein the international mobile subscriber identifier identifies a user equipment, wherein the user equipment generates the data request received by the at least one programmable processor.

13. The base station according to claim 11, wherein the header is a hypertext transfer protocol (HTTP) response header and includes a X-international mobile subscriber identity (X-IMSI) header containing the international mobile subscriber identifier.

14. The base station according to claim 11, wherein:
the at least one communication function includes at least one of the following: a charging function and an interception function; and
at least one of the charging function and the interception function are performed by at least one of the following: the at least one processor and the at least one server.

15. The base station according to claim 14, wherein:
the charging function includes computing, based on network data used by a user equipment generating the data request received by the at least one programmable processor, a financial charge for the user equipment, the financial charge being associated with at least one of the following: the data request and the received data; and the first data is the financial charge, the financial charge being charged by a communications network provider.

16. The base station according to claim 14, wherein:
the first data includes an identification of at least one of the following: the user equipment, the data request, the data received in response to the data request, and the at least one programmable processor; and
the interception function includes generating a report, the report identifying at least one of the following: a user equipment generating the data request received by the at least one programmable processor, the data request, the data received in response to the data request, and the at least one programmable processor.

17. A non-transitory computer program product storing instructions that, when executed by at least one programmable processor, cause the at least one programmable processor to perform operations comprising:
receiving, by a base station, data in response to a data request, wherein the data request is transmitted by a user equipment to the base station, the received data is transmitted from a core network communicatively coupled to the base station and includes a header including an international mobile subscriber identifier, the international mobile subscriber identifier is associated with the user equipment and added by the core network prior to transmission to the base station;
removing, by the base station, the international mobile subscriber identifier from the received data;
generating, by the base station, based on the removed international mobile subscriber identifier, a first data for use in performing at least one communication function; and
transmitting, by the base station, the first data to at least one server communicatively coupled to the base station.

18. The non-transitory computer program product according to claim 17, wherein:
the international mobile subscriber identifier identifies a user equipment, wherein the user equipment generates the data request received by the at least one programmable processor;
the header is a hypertext transfer protocol (HTTP) response header and includes a X-international mobile subscriber identity (X-IMSI) header containing the international mobile subscriber identifier; and
the at least one communication function includes at least one of the following: a charging function and an interception function, at least one of the charging function and the interception function being performed by at least one of the following: the at least one processor and the at least one server.

19. The non-transitory computer program product according to claim 18, wherein:
the charging function includes computing, based on network data used by a user equipment generating the data request received by the at least one programmable processor, a financial charge for the user equipment, the financial charge being associated with at least one of the following: the data request and the received data; and
the first data is the financial charge, the financial charge being charged by a communications network provider.

20. The non-transitory computer program product according to claim 18, wherein:
the first data includes an identification of at least one of the following: the user equipment, the data request, the data received in response to the data request, and the at least one programmable processor; and
the interception function includes generating a report, the report identifying at least one of the following: a user equipment generating the data request received by the at least one programmable processor, the data request, the data received in response to the data request, and the at least one programmable processor.

* * * * *